United States Patent
Luo et al.

(10) Patent No.: US 11,117,569 B2
(45) Date of Patent: Sep. 14, 2021

(54) PLANNING PARKING TRAJECTORY GENERATION FOR SELF-DRIVING VEHICLES USING OPTIMIZATION METHOD

(71) Applicant: Baidu USA LLC, Sunnyvale, CA (US)

(72) Inventors: Qi Luo, Sunnyvale, CA (US); Dong Li, Sunnyvale, CA (US); Yajia Zhang, Sunnyvale, CA (US); Liangliang Zhang, San Jose, CA (US); Yifei Jiang, Sunnyvale, CA (US); Jiaming Tao, Sunnyvale, CA (US); Kecheng Xu, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 386 days.

(21) Appl. No.: 16/020,649

(22) Filed: Jun. 27, 2018

(65) Prior Publication Data

US 2020/0001862 A1    Jan. 2, 2020

(51) Int. Cl.
*B60W 30/06* (2006.01)
*G05D 1/02* (2020.01)
(Continued)

(52) U.S. Cl.
CPC .......... *B60W 30/06* (2013.01); *G05D 1/0088* (2013.01); *G05D 1/0212* (2013.01);
(Continued)

(58) Field of Classification Search
CPC .............. G05D 1/0212; G05D 1/0088; G06K 9/00805; G06K 9/00812; B60W 30/06; B60W 2554/00; B60W 2710/20
See application file for complete search history.

(56) References Cited

U.S. PATENT DOCUMENTS

| | | | | |
|---|---|---|---|---|
| 5,870,303 A | * | 2/1999 | Trovato | G05B 19/4061 700/61 |
| 2005/0075784 A1 | * | 4/2005 | Gray | G01C 21/00 701/25 |

(Continued)

FOREIGN PATENT DOCUMENTS

| | | |
|---|---|---|
| JP | 2009064088 | 3/2009 |
| JP | 20120232608 | 11/2012 |

*Primary Examiner* — Stephen Holwerda
(74) *Attorney, Agent, or Firm* — Womble Bond Dickinson (US) LLP

(57) ABSTRACT

A parking system for autonomous driving vehicles optimizes a solution to a parking problem. The ADV detects a parking lot and selects a parking space. The ADV defines constraints for the parking lot, parking space, and kinematic constraints of the ADV, and generates a plurality of potential parking paths to the parking space, taking into account the constraints of the parking lot, parking space, and kinematics of the ADV, but without taking into any obstacles that may be surrounding the ADV. The ADV determines a cost for traversing each of the parking paths. One or more least cost candidate paths are selected from the parking paths, then one or more candidate paths are eliminated based on obstacles surrounding the ADV. Remaining candidates can be analyzed using a quadratic optimization system. A best parking path can be selected from the remaining candidates to navigate the ADV to the parking space.

21 Claims, 9 Drawing Sheets

(51) Int. Cl.
*G05D 1/00* (2006.01)
*G06K 9/00* (2006.01)

(52) U.S. Cl.
CPC ..... *G06K 9/00805* (2013.01); *B60W 2554/00* (2020.02); *B60W 2710/20* (2013.01)

(56) References Cited

U.S. PATENT DOCUMENTS

| | | | | |
|---|---|---|---|---|
| 2006/0190147 | A1* | 8/2006 | Lee | B62D 15/028 |
| | | | | 701/26 |
| 2008/0125939 | A1* | 5/2008 | Luke | B62D 15/027 |
| | | | | 701/41 |
| 2010/0289670 | A1* | 11/2010 | Boehme | B60Q 9/004 |
| | | | | 340/932.2 |
| 2011/0082613 | A1* | 4/2011 | Oetiker | B62D 15/0285 |
| | | | | 701/25 |
| 2012/0101654 | A1* | 4/2012 | Samples | G08G 1/147 |
| | | | | 701/1 |
| 2015/0134185 | A1* | 5/2015 | Lee | G05D 1/0214 |
| | | | | 701/26 |
| 2017/0129538 | A1* | 5/2017 | Stefan | B60W 30/06 |
| 2017/0355307 | A1* | 12/2017 | Ha | H04N 7/183 |
| 2018/0093663 | A1* | 4/2018 | Kim | G08G 1/168 |

\* cited by examiner

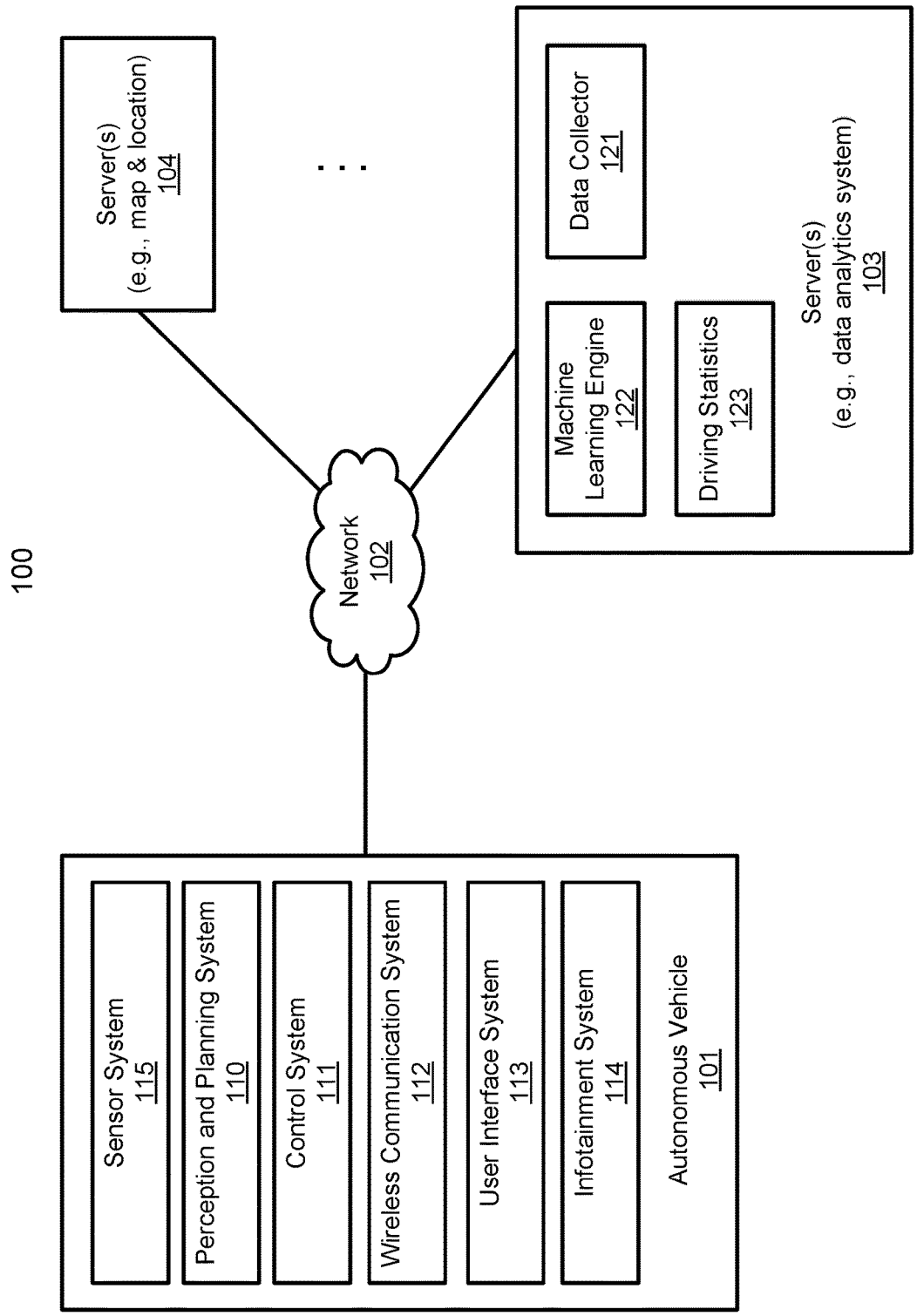
FIG. 1
Replacement Sheet

| Path | Segment | Cost | Value |
|---|---|---|---|
| 1 | 1 | $c_{1,1}$ | 7 |
| 1 | 2 | $c_{1,2}$ | 8 |
| 1 | 3 | $c_{1,3}$ | 6 |
| 1 | 4 | $c_{1,4}$ | 5 |
| Total cost, path 1 | | | 26 |
| 2 | 1 | $c_{2,1}$ | 3 |
| 2 | 2 | $c_{2,2}$ | 5 |
| 2 | 3 | $c_{2,3}$ | 4 |
| Total cost, path 2 | | | 12 |
| 3 | 1 | $c_{3,1}$ | 2 |
| 3 | 2 | $c_{3,2}$ | 3 |
| 3 | 3 | $c_{3,3}$ | 4 |
| Total cost, path 3 | | | 11 |

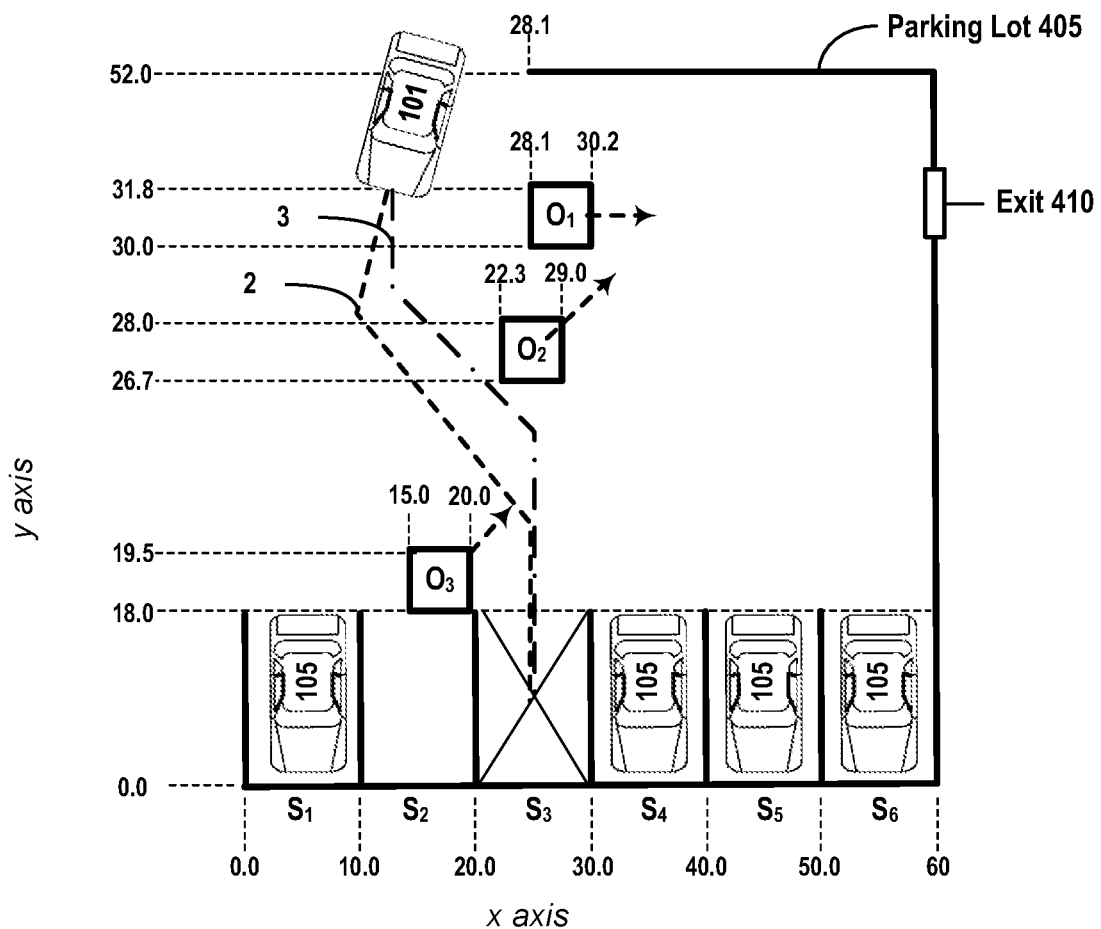

| Obstacle | Constraints | | | |
|---|---|---|---|---|
| $O_1$ | $x \geq 28.1$ | $x \leq 30.2$ | $y \geq 30.0$ | $y \leq 31.8$ |
| $O_2$ | $x \geq 22.3$ | $x \leq 29.0$ | $y \geq 26.7$ | $y \leq 28.0$ |
| $O_3$ | $x \geq 15.0$ | $x \leq 20.0$ | $y \geq 18.0$ | $y \leq 19.5$ |
| Space $S_1$ | $x \geq 0.0$ | $x \leq 10.0$ | $y \geq 0.0$ | $y \leq 18.0$ |
| Space $S_2$ | $x \geq 10.0$ | $x \leq 20.0$ | $y \geq 0.0$ | $y \leq 18.0$ |
| Space $S_3$ | $x \geq 20.0$ | $x \leq 30.0$ | $y \geq 0.0$ | $y \leq 18.0$ |
| Space $S_4$ | $x \geq 30.0$ | $x \leq 40.0$ | $y \geq 0.0$ | $y \leq 18.0$ |
| Space $S_5$ | $x \geq 40.0$ | $x \leq 50.0$ | $y \geq 0.0$ | $y \leq 18.0$ |
| Space $S_6$ | $x \geq 50.0$ | $x \leq 60.0$ | $y \geq 0.0$ | $y \leq 18.0$ |

FIG. 4B

PLANNING PARKING TRAJECTORY GENERATION FOR SELF-DRIVING VEHICLES USING OPTIMIZATION METHOD

TECHNICAL FIELD

Embodiments of the present disclosure relate generally to operating autonomous vehicles. More particularly, embodiments of the disclosure relate to parking planning for optimizing parking planning for autonomous driving vehicles (ADVs) in the presence of potential obstacles.

BACKGROUND

Parking planning is important when navigating an autonomous driving vehicle (ADV) around one or more moving obstacles on the ADV's route to a parking space. In the prior art, parking planning algorithms use a zig-zag algorithm that accounts for static obstacles immediately surrounding the vehicle being parked. Such obstacles may include other parked cars, road curbs, and other fixed obstacles. Parking logic in vehicles that provide a human driver with an automated parking-assist feature can detect objects surrounding the vehicle, but do not predict the location, speed, and direction of the objects. Thus, an obstacle may not initially be close to a moving vehicle, but the obstacle may be moving toward the vehicle and will not be considered by the parking logic until the obstacle is within a predetermined boundary surrounding the vehicle. That may be too late to avoid a collision with the moving obstacle.

Current parking logic in automated parking-assist systems does not take into account the movement of the obstacles when parking the vehicle. ADVs can detect moving obstacles. But, ADVs of the prior art are designed for forward driving. Parking often involves driving in reverse during at least a portion of the parking process. ADVs of the prior art perform parking in the same manner as human-driven cars having parking assist: they treat obstacles as static objects and do not take into account obstacle speed, direction, and movement, when planning a parking path, particularly when the parking path involves driving in reverse.

In the prior art, solutions to parking problems are computationally expensive. Some do not produce a solution within a 100 seconds or more, which is an unacceptable delay for passengers to park and ADV. Further, some prior art solutions are not guaranteed to produce a solution to a parking problem at all.

BRIEF DESCRIPTION OF THE DRAWINGS

Embodiments of the present disclosure are illustrated by way of example and not limitation in the figures of the accompanying drawings in which like references indicate similar elements.

FIG. 1 is a block diagram illustrating a networked system for implementing an optimized method for planning of parking trajectory when parking an autonomous driving vehicle (ADV), according to one embodiment.

FIG. 4B illustrates an example of an ADV performing a portion of an optimized method for planning a parking trajectory when parking an autonomous driving vehicle (ADV), according to one embodiment.

DETAILED DESCRIPTION

Figure 2:
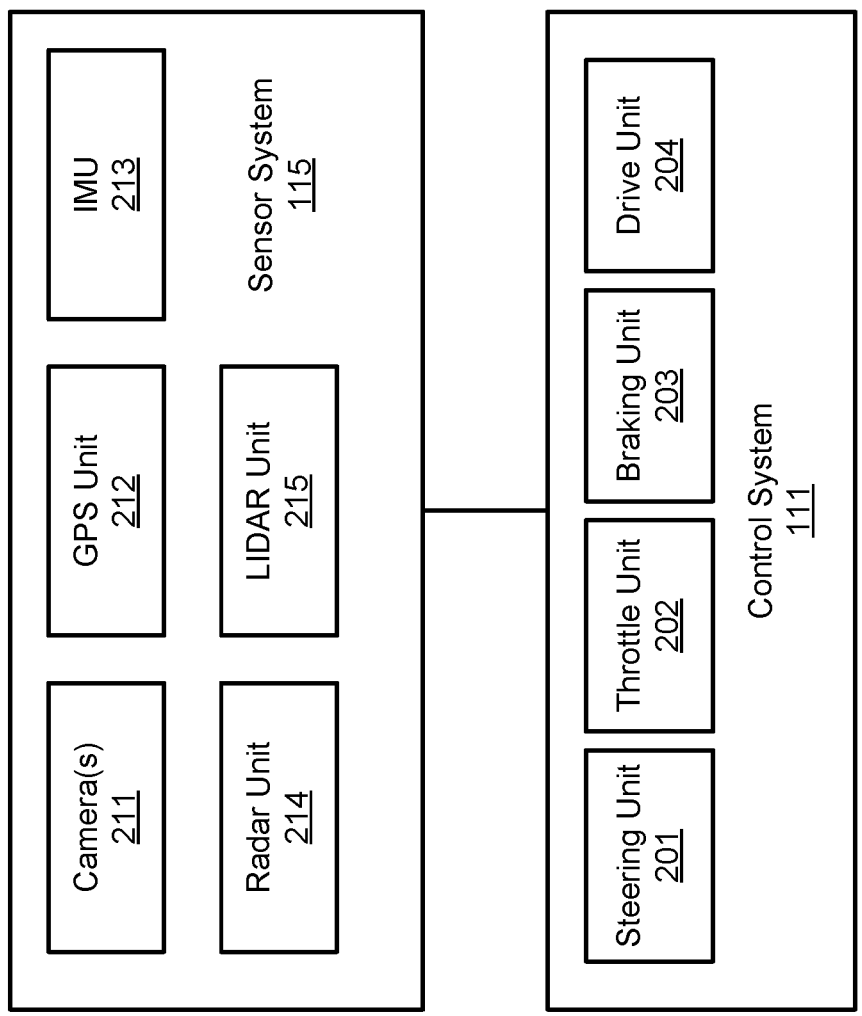
FIG. 2 is a block diagram illustrating an example of an autonomous vehicle that can implement an optimized method for planning of parking trajectory when parking an autonomous driving vehicle (ADV), according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In one embodiment, a computer-implemented method of parking an autonomous driving vehicle (ADV), includes determining a plurality of parking space constraints of a selected parking space and determining a plurality of parking paths from a current location of the ADV to the selected parking space based at least in part on the plurality of parking space constraints of the selected parking space. A cost for each parking path in the plurality of parking paths is determined and one or more candidate parking paths are selected from the plurality of parking paths having the least cost. One or more of the selected candidate parking paths are eliminated as a candidate parking path, based at least in part upon one or more obstacles surrounding the ADV along each of the candidate parking paths. A parking path is selected from the remaining candidate parking paths, and a reference line is generated to navigate the ADV based on the selected parking path. The ADV navigates from the current ADV location to the parking space using the reference line.

In another embodiment, an ADV locates a parking lot, determines the location of the ADV within the parking lot, and selects a parking space within the parking lot in which to park the ADV. The ADV forms a parking problem into a plurality of parking space constraints and kinematic constraints of the ADV. Kinematic constraints can be physical dimensions of the ADV, maximum and minimum acceleration values, maximum and minimum speed values, a maximum steering angle of the ADV, weight of the ADV, maximum braking capability of the ADV, and the like. In an embodiment, the ADV forms the parking space constraints and parking lot constraints into a set of affines and generates a plurality of parking paths, without considering obstacles surrounding the ADV. Each parking path has one or more segments, and each segment has a cost associated with it. Cost of a segment can include a distance to travel, a time to travel the distance of the segment. In an embodiment, other cost factors can include a amount of acceleration, speed, or turning angle required to navigate the segment. The cost of a parking path can be the sum of the costs of each of the segments in the parking path. The ADV can select one or more candidate parking paths, having the least cost, from the plurality of parking paths. The ADV can then consider obstacles surrounding the ADV and eliminate one or more of the candidate parking paths. To determine whether to eliminate a parking path, the obstacles to the ADV, and constraints on the parking lot and parking space can be expressed as a set of affines. Each candidate parking path can analyzed for whether one or more obstacles conflict with one or more segments of a candidate parking path. A candidate parking path can be optimized using a quadratic optimization method. From the remaining candidates, a suitable parking path can be found. If no suitable parking path is found, then ADV logic can automatically adjust relaxation of one or more of the constraints in the parking problem, the constraints including obstacles, parking space, and ADV kinematics constraints. The ADV logic can then generate another plurality of parking paths based upon the relaxed constraints. Once a suitable parking path is selected from the remaining parking candidate parking paths, the ADV can generate a reference line for the ADV to use to navigate from the ADV's current location to the selected parking space.

Any of the method operations disclosed herein can implemented by a processing system comprising at last one hardware processor coupled to a memory programmed with executable instructions that, when executed, perform the method operations. Such executable instructions can also be stored on one or more non-transitory computer readable media.

FIG. 1 is a block diagram illustrating a networked system 100 for implementing an optimized method for planning of parking trajectory when parking an autonomous driving vehicle (ADV), according to one embodiment.

Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In an embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS unit 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. Cameras 211 may include an infra-red camera. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In an embodiment, vehicle control system 111 includes, but is not limited to, steering unit 201, throttle unit 202 (also referred to as an acceleration unit), braking unit 203, and drive unit 204. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Braking unit can alternatively, or in addition, including electrical (regenerative) braking, braking by engine compression, air brake, or other controllable system of decelerating the ADV. Drive unit 204 controls a drive mechanism of the autonomous vehicle. The drive unit 204 can control whether the autonomous driving vehicle is driven in a forward direction or in a reverse direction. Forward and reverse direction of the drive unit 204 have their conventional meaning: in a forward direction, the drive wheels of the autonomous vehicle move the ADV in a direction that is understood as the front of the ADV. In a reverse direction, the drive wheels of the ADV drive the ADV in a direction that is understood as the rear of the ADV. In an embodiment, drive unit 204 can also select from one or more drive gears in a transmission of the vehicle. Alternatively, the ADV can have an automatic transmission or a continuously variable transmission that does not require a selection of a particular forward gear. In an embodiment, drive unit 204 can also set a "park" position of the transmission that does not drive the ADV in either a forward direction or a reverse direction. In an embodiment, drive unit 204 can also set, and release, a parking brake. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently. An optimal route can include a plurality of segments, each of which can be optimized by the perception and planning system 110 by determining an optimal path curve for the segment from a plurality of candidate path curves for the segment, each generated by the perception and planning system 110.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 can include parking paths planning by planning module 110 and statistics regarding the success or failure of chosen parking paths. The driving statistics 123 can be used with machine learning engine 122 to train on successful parking paths.

Figure 3:
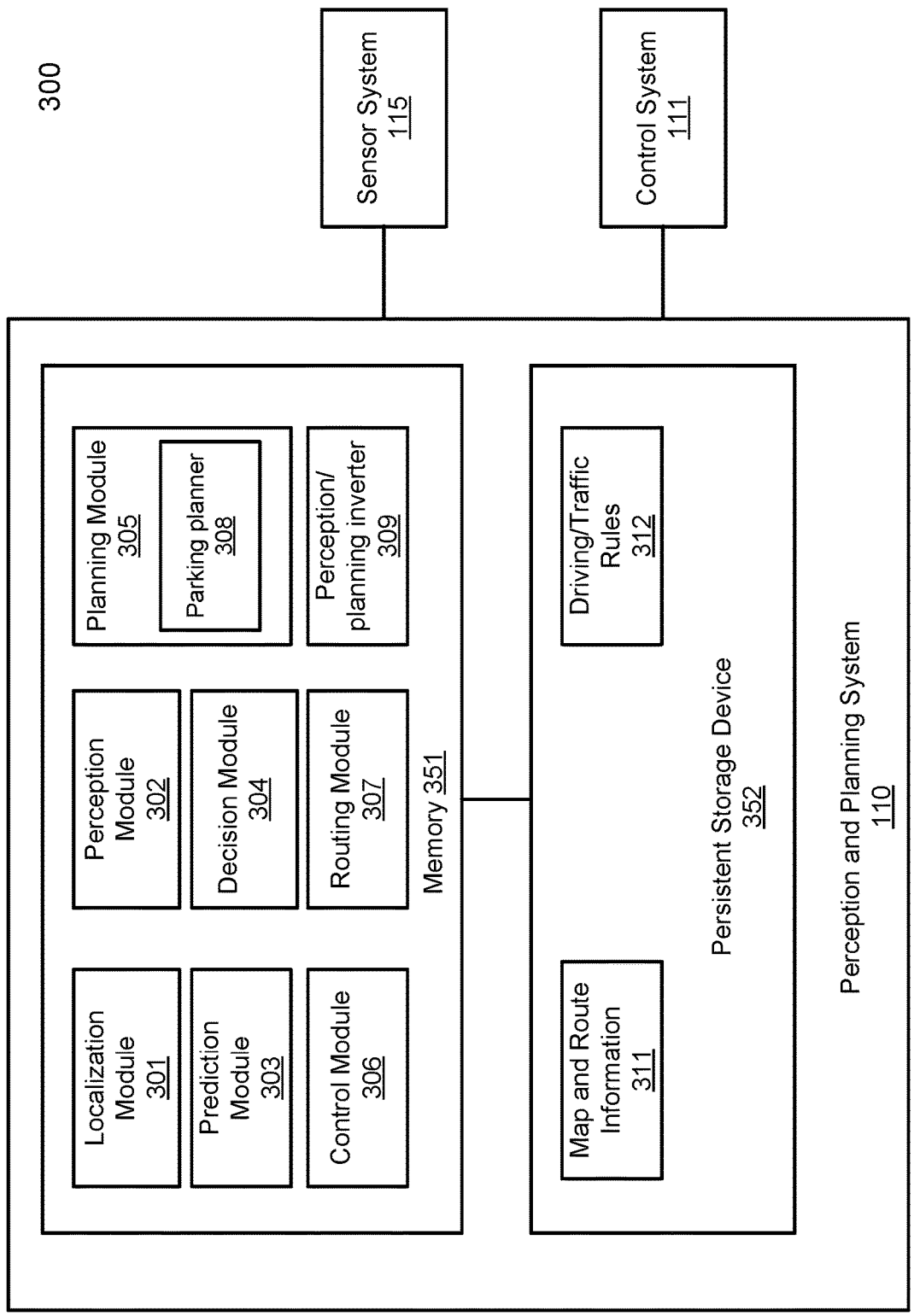
FIG. 3 is a block diagram illustrating an example of a perception and planning system of an autonomous vehicle that implements an optimized method for planning of parking trajectory and obstacle avoidance when parking an autonomous driving vehicle (ADV), according to one embodiment.

FIG. 3 is a block diagram illustrating an example of a perception and planning system 300 of an autonomous vehicle that implements an optimized method for planning of parking trajectory and obstacle avoidance when parking an autonomous driving vehicle (ADV), according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, and parking planner 308, and perception/planning inverter 309. Localization module 301 can include map and route data 311 and routing module 307.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 may be referred to as a map and route module. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, and the least path curve determined from the plurality of candidate path curves for a driving segment of a route, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control, and drive unit commands) based on the planning and control data of the current cycle. Control module 306 can be bypassed such that a human driver can control the ADV while other logic of the ADV remains operational.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time. Examining all of the possible routes can include, for a route selected from the possible route, determining a segment of the selected route, and determining a plurality of candidate path curves for navigating the segment of the selected route. Navigating a driving segment (or "path") can include determining a parking path from a current location of the ADV to a parking space selected by the ADV logic. Parking logic can be implemented in the parking planner 308.

Parking planner 308 can be incorporated in planning module 305, or can be implemented as a separate logic unit of the ADV. Parking planner 308 can access other modules of perception and planning system 110 such as map and route information 311, localization module 301, perception module 203, prediction module 303, and other modules of perception and planning system 110. Parking planner 308 can scan a parking area, such as a parking lot, to determine whether a parking space is available in the parking area. Parking planner 308 can use map and route information 311 in performing the scanning of the parking lot. Parking planner 308 can select a parking space from one more available spaces and generate one or more parking paths the parking space.

Navigating a parking path may be preceded by navigating an approach path that positions the ADV near the parking space, or parking area, such that parking-specific logic can be invoked to park the ADV in the parking space. The approach path can be navigated using existing ADV logic. A parking path can have at least a first portion and second portion, in which the ADV changes direction from a forward drive direction to a reverse drive direction, or reverse to forward. In the forward drive direction, the ADV perception and planning logic can perceive obstacles, predict a speed, direction, and location of the obstacles, and plan a smooth reference line for the ADV 101 to navigate a portion of the parking path. In the reverse driving direction, the ADV 101 can invert orientation of the planning, perception, and prediction modules so that obstacles can again be located, and speed, direction, and location can be predicted. The perception 302, and prediction 303, and planning 305, modules can be inverted using perception/planning inverter 309.

In an embodiment, parking planner 308 can take into account one or more physical factors ("kinematics") of the ADV 101. For example, when the ADV 101 is driven in the reverse driving direction, the wheels that perform a steering function may be located at an opposite end of the ADV, thus causing minor changes in how the ADV handles and navigates along a reference path. Steering geometry, braking, acceleration, suspension, weight distribution, gear ratios, and other physical factors may have an effect on the handling of the vehicle during reverse direction driving vs. forward direction driving. Parking planner 308 can account for these kinematic differences between driving in the forward direction vs. driving in the reverse direction as constraints on a parking problem to be solved to navigate from a current location of the ADV to a selected parking space.

Parking planner 308 can determine a plurality of parking paths from a current location of the ADV to the selected parking space. Parking paths can be determined using a zig-zag method to take into account limitations of steering angle, ADV length and width, and a distance and direction of the ADV to the selected parking space. The parking paths can initially be generated without regard to any obstacles that may be near the ADV. Each parking path may have one or more segments that make up the parking path. Each segment can have an associated cost such that a cost can be associated with a parking path by summing the cost of the segments in the parking path. Cost factors for a segment can include a time and distance to traverse the segment, a steering angle required to navigate the segment, or an amount of acceleration, braking, or speed needed to traverse the segment. Parking planner 308 can select one or more candidate paths having the least cost of the plurality of generated parking paths that were generated without regard to obstacles surrounding the ADV. Next, when taking into account obstacles surrounding the ADV, one or more of the candidate paths may be eliminated based on a segment of the path conflicting with, or being too close to, an obstacle to the ADV along a segment of the path. From the remaining candidate paths, parking planner 308 can select a parking path for navigating the ADV to the parking selected parking space. ADV planning module can generate a reference path corresponding to the selected path to navigate the ADV from the current location of the ADV to the selected parking space. If, after eliminating one or more candidate paths, no candidate path remains to select for parking the ADV, then one or more parking constraints can be automatically relaxed, and a new plurality of parking paths can be generated, their respective costs determined, one or more candidate paths selected, one or more candidate paths eliminated based on obstacles present along the candidate paths, and a parking selected from the remaining paths. These computational processes are sufficiently light that the processes can be iterated several times to find a suitable path for the ADV to navigate to the selected parking space.

Perception/planning inverter module 309 can logically invert the orientation and operation of the perception 302, prediction 303, and planning 305 modules in accordance with the driving direction of the ADV 101. An advantage of the present disclosure is that the perception, prediction, and planning modules of an ADV can be used during parking. Parking often requires that at least a portion of a parking path be driven in a reverse driving direction. The perception, prediction, and planning modules of the forward direction logic in an ADV can be logically inverted and utilized for reverse direction driving. For example, when an ADV is driving forward, an obstacle that is located at the front right of the ADV would be located at the rear left of the ADV when the ADV is driven in reverse driving mode. If that same object were getting closer to the ADV in forward driving direction, either by the ADV driving toward the obstacle or the obstacle approaching the ADV, or both, then when the ADV is driven in the reverse driving direction the obstacle would be either receding from the ADV, still approaching the ADV, but more slowly, or appear to not be moving, because the ADV is moving in a reverse direction. Thus, the ADV perception, prediction, and planning logic can be used in both forward and reverse driving directions to detect obstacles, and predict their location, direction and speed. To accomplish this, the perception, prediction, and planning need to be logically invertible to account for the change in direction of the ADV. In an embodiment, inverting the perception, prediction, and planning modules can include rotating the orientation of the modules logically by 180°.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4A:
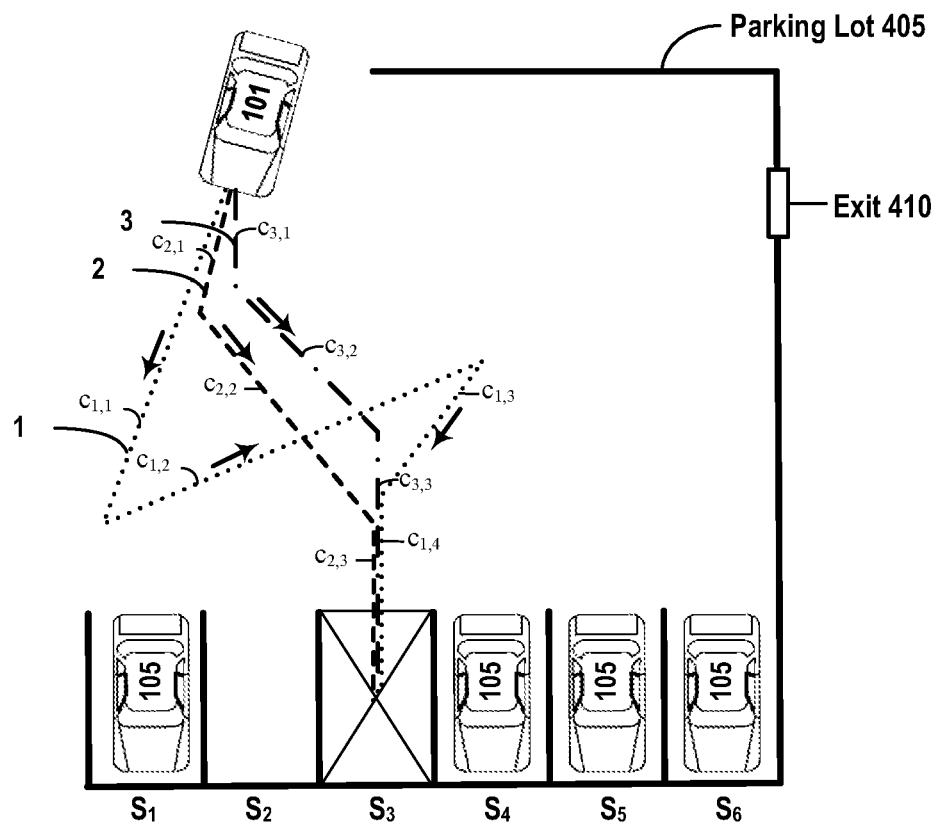
FIG. 4A illustrates an example of an ADV performing a portion of an optimized method for planning a parking trajectory when parking an autonomous driving vehicle (ADV), according to one embodiment.

FIG. 4A illustrates an example of an ADV performing a portion of an optimized method for planning a parking trajectory when parking an autonomous driving vehicle (ADV), according to one embodiment.

In FIG. 4A, an ADV 101 has approached and entered a parking lot 405 that includes parking spaces $S_1$ through $S_6$ ($S_1 \ldots S_6$). Parking lot 405 also has a pedestrian exit 410. Parked cars 105 are shown in parking spaces $S_1$, $S_4$, $S_5$, and $S_6$. Parking spaces $S_2$ and $S_3$ are available. As the ADV 101 approaches the parking lot 405, ADV 101 can use a high-definition map and ADV sensors to determine that parking spaces $S_1$ and $S_4$-$S_6$ are occupied, and that parking spaces $S_2$ and $S_3$ are available, and a location of the available parking spaces. ADV 101 can also determine the location of ADV 101 within the parking lot 405. ADV 101 can use the high definition map and ADV 101 sensors to form a parking problem which includes the parking lot 405, parking space $S_3$, and ADV 101 location as constraints for determining potential parking paths to parking space $S_3$. ADV 101 can also use kinematic constraints of the ADV 101 in defining the parking problem. Kinematic constraints of the ADV 101 can include dimensions of the ADV 101, a maximum speed and/or acceleration of the ADV 101, weight of the ADV 101, maximum steering angle of the ADV 101, and braking ability of the ADV 101, for example. Other kinematic constraints can also be used. The initial parking problem does not consider obstacles surrounding the ADV 101.

ADV 101 can generate a plurality of parking paths that are potential solutions to the parking problem of navigating the ADV 101 from its current location to the selected parking space $S_3$, taking into account the parking lot constraints, parking space constraints, and kinematic constraints of the ADV 101, but not obstacles to the ADV. In FIG. 4A, ADV 101 parking planner 308 has generated three example parking paths labeled 1, 2, and 3. ADV 101 can generate any number of parking paths. For simplicity, FIG. 4A shows just three examples. Parking path 1 is shown in dotted lines, parking path 2 is shown in dashed lines, and parking path 3 is shown in dot-dash lines. As show in the table below parking lot 405, each parking path can have a plurality of segments. Each parking path segment can have a cost element, $c_{i,j}$, wherein i is the parking path number, and j is the segment number of the parking path i. Each parking path segment cost element $c_{i,j}$ can have cost value. The sum of the cost values for the segments in a parking path is the cost of the parking path. Cost can be determined by const factors including speed and time to traverse the segment, distance from the parking space, steering angle required to navigate the segment, or other factors including kinematic factors of the ADV 101. ADV 101 can select one or more candidate paths having the least cost of the plurality of paths 1-3. In an example, ADV 101 may select paths 2 and 3 as candidate paths having a least cost as compared to path 1.

FIG. 4B illustrates an example of an ADV performing a portion of an optimized method for planning a parking trajectory when parking an autonomous driving vehicle (ADV), according to one embodiment. In FIG. 4B, ADV 101 can now consider obstacles, e.g. obstacles $O_1$, $O_2$, and $O_3$, surrounding the ADV 101. Each obstacles can have constraints expressing the location of the obstacle with respect to the parking lot 405.

Parking lot 405 is shown with a grid having an origin (0,0) at the lower left corner of the parking lot 405. Constraints of an obstacle can be expressed as bounding lines with respect to the grid of parking lot 405. Bounding lines for each obstacle $O_1 \ldots O_3$ and parking space $S_1 \ldots S_6$ are shown in the table below the parking lot 405 in FIG. 4B.

Parking path 1, shown in FIG. 4A, was removed from consideration as not being one of the least cost parking paths. Thus the candidate paths of the plurality of parking paths is now limited to parking paths 2 and 3, shown in FIG. 4B and candidate paths 2 and 3 will be considered in view of obstacles $O_1 \ldots O_3$. Each obstacle $O_1 \ldots O_3$ can also have a trajectory associated with the obstacle, shown by a dashed line with an arrow indicating a direction and speed of the obstacle as determined by ADV 101 prediction module. As can be seen in FIG. 4B, each obstacle $O_1 \ldots O_3$ has a direction and speed toward the exit 410, such as a pedestrian would use. In an embodiment, ADV 101 parking planner 308 can interact with perception and prediction modules to enlarge the constraints of an obstacle to take into account the predicted direction and speed of the obstacle at the time that the ADV 101 will navigate a parking path to the selected parking space. ADV 101 can determine that candidate paths 2 and 3 have similar costs. See the cost table in FIG. 4A. However, path 3 appears to conflict with obstacle $O_2$ taking into account the constraints of obstacle $O_2$ and the kinematic constraints of ADV 101. Specifically, in this case, the kinematic constraint of the ADV 101 width appears to create a conflict with obstacle $O_2$ at the second segment of candidate parking path 3. Thus, candidate parking path 3 can be eliminated from the candidate parking paths. Obstacle $O_3$ has a predicted speed and direction that crosses, but does not directly conflict with, the candidate parking path 2. Based on the predicted speed and direction of obstacle $O_3$, and the constraints of $O_3$ and ADV 101, ADV 101 logic can predict that $O_3$ will not present a conflict with ADV 101 on candidate path 2 by the time that ADV 101 reaches the current position of obstacle $O_3$. In an embodiment, the parking problem, for each candidate path, including kinematic constraints on the ADV 101, the constraints on parking lot 405, the constraints on parking space $S_3$, and obstacles $O_1 \ldots O_3$, can be passed processed by a quadratic optimization system to determine that path 2 is the best selection, as between paths 2 and 3, for the ADV 101 to select.

Figure 4C:
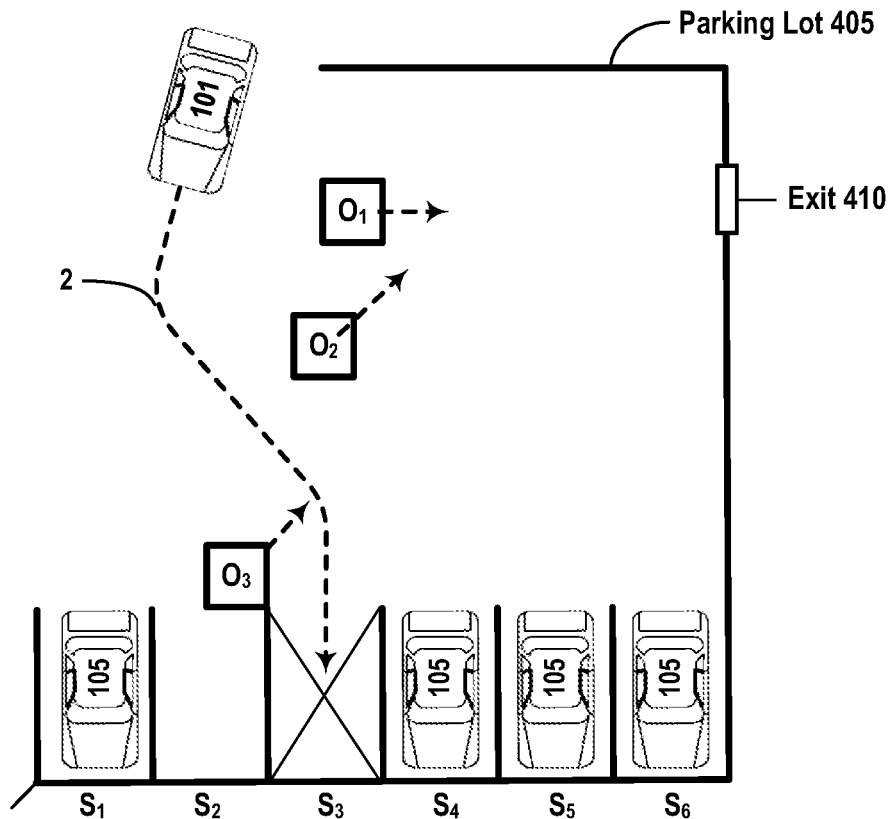
FIG. 4C illustrates an example of an ADV performing a portion of an optimized method for planning a parking trajectory when parking an autonomous driving vehicle (ADV), according to one embodiment

FIG. 4C illustrates an example of an ADV performing a portion of an optimized method for planning a parking trajectory when parking an autonomous driving vehicle (ADV), according to one embodiment. In FIG. 4C, candidate parking path 2 has been selected for navigating the ADV 101 from its current position to parking space $S_3$. Candidate parking path 2 can be processed by the ADV 101 planning module to generate a reference line to navigate the ADV 101 from the current location of ADV 101 to parking space $S_3$. Reference line 2 has been smoothed by the planning module.

Figure 5:
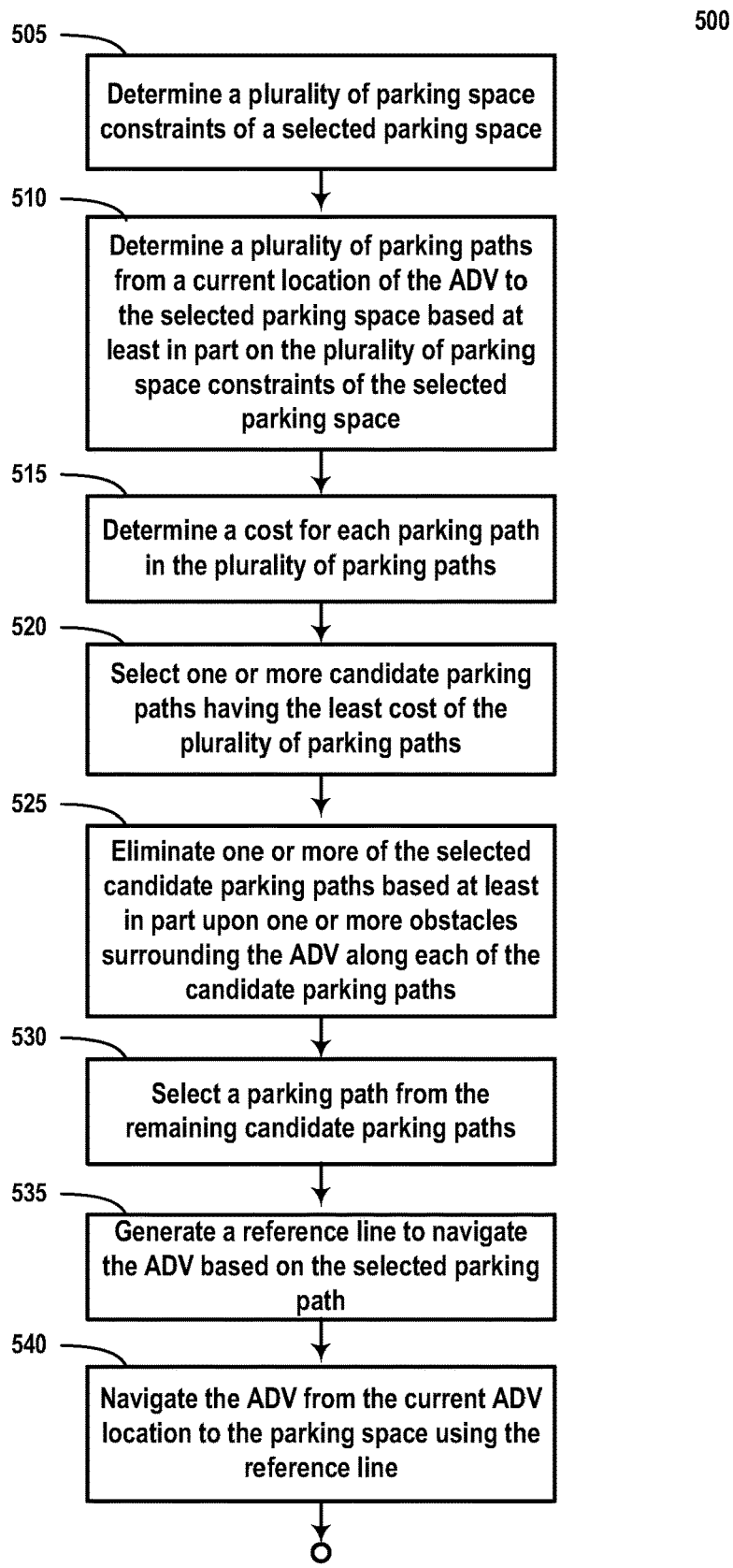
FIG. 5 is a block diagram of an optimized method of planning a parking trajectory when parking an autonomous driving vehicle (ADV), according to an embodiment.

FIG. 5 is a block diagram of an optimized method 500 of planning a parking trajectory when parking an autonomous driving vehicle (ADV), according to an embodiment.

In operation 505, parking planner 308 can determine a plurality of constraints for a parking lot, e.g. parking log 405, and a selected parking space, e.g. parking space $S_3$ to define a parking problem for parking the ADV 101 in the selected parking space.

In operation 510, parking planner 308 can determine a plurality of parking paths from a current location of ADV 101 to the selected parking space, based at least in part on the plurality of parking space constraints of the selected parking space and the parking lot. In an embodiment, the plurality of parking paths can be further be determined using kinematic constraints of the ADV 101, such as a maximum steering angle, maximum acceleration and speed capabilities of the ADV 101, weight, width, and length of the ADV 101. The generation of the plurality of parking paths is made without regard to one or more obstacles surrounding the ADV 101.

In operation 515, parking planner 308 can further determine a cost for each of the plurality of parking paths, each parking path having one or more segments. Each segment of a parking path can have an associated cost. The cost of a parking path can be determined as the sum cost of each segment of the parking path. Cost factors for a segment can include a distance, time, and speed at which a segment is traversed, a steering angle needed to navigate the segment, whether a change of direction is required, e.g. from forward to reverse, and/or reverse to forward, to traverse the segment, and the like.

In operation 520, parking planner 308 can select one or more candidate parking paths having the least cost of the plurality of parking paths. In embodiment, parking planner 308 may select a fixed number of least cost candidate parking paths, or a threshold number percentage such as the 10% of the parking paths having the least cost of the plurality of parking paths. The selection of candidate parking paths is made without regard to one or more obstacles surrounding the ADV 101.

In operation 525, parking planner 308 can take into account one or more obstacles surrounding the ADV 101, detected by the ADV perception module and having a direction and speed predicted by the prediction module. Parking planner 308 can eliminate one or more of the candidate parking paths based upon an obstacle, or a predicted location for an obstacle, conflicting with a segment of the candidate parking path. In an embodiment, the parking lot constraints, parking space constraints, and obstacle restraints can be represented as a set of affines and passed, along with the ADV 101 kinematic constraints, to a quadratic optimization system to determine whether a candidate path should be kept or eliminated.

In operation 530, parking planner 308 can select a best candidate parking path from the remaining candidate parking paths.

In operation 535, the ADV planning module can generate a reference line for the ADV to navigate from the current location of the ADV to the selected parking space.

In operation 540, the ADV can use the generated reference line to navigate from the current location of the ADV 101 to the selected parking space.

Figure 6:
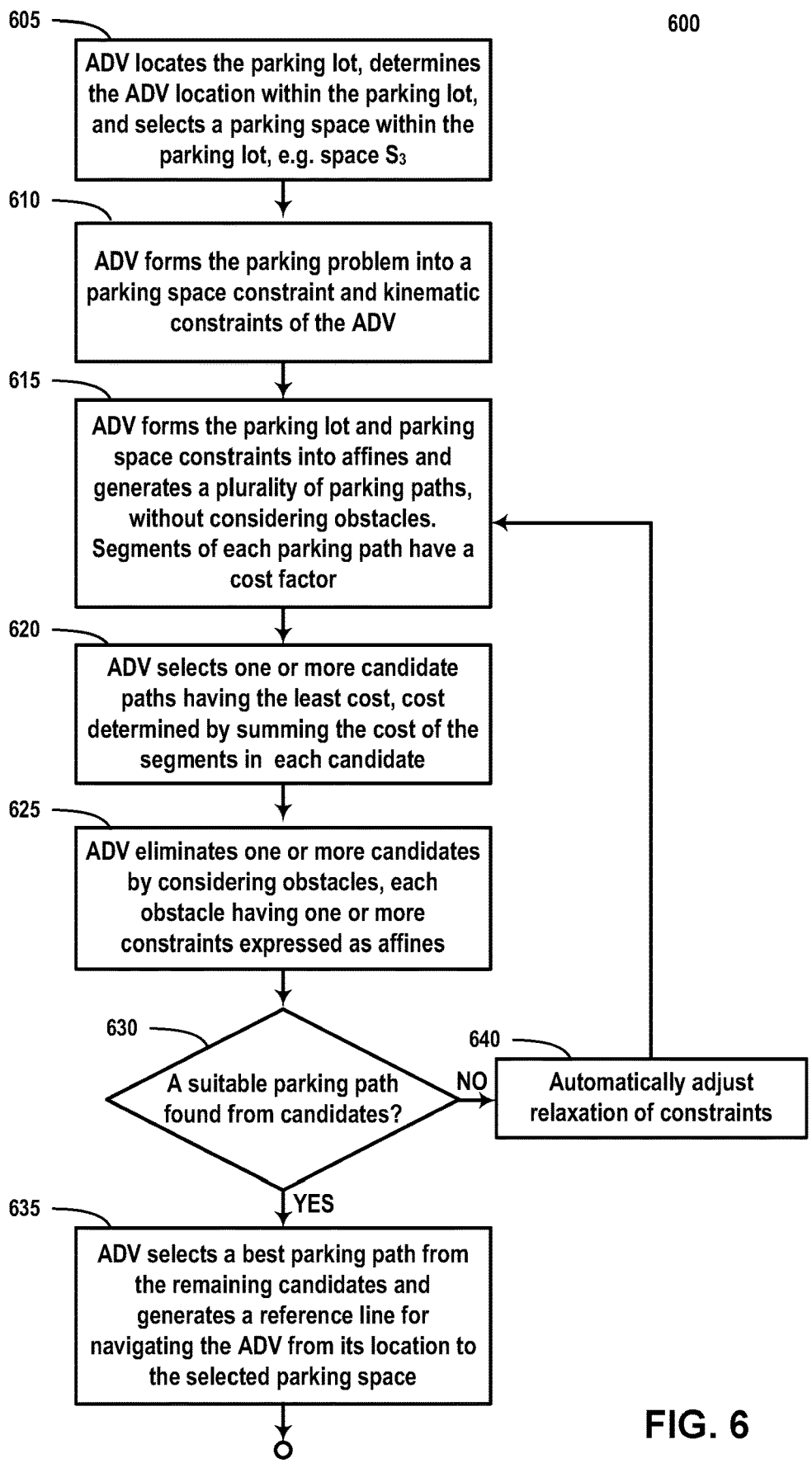
FIG. 6 is a block diagram of an optimized method of planning a parking trajectory when parking an autonomous driving vehicle (ADV), according to an embodiment.

FIG. 6 is a block diagram of an optimized method 600 of planning a parking trajectory when parking an autonomous driving vehicle (ADV), according to an embodiment.

In operation 605, ADV 101 locates a parking lot, e.g. parking lot 405, and selects a parking space from the parking lot, e.g. parking space $S_3$ of FIGS. 4A-4C. ADV 101 can use a high definition map and onboard sensors of a perception module to determine the existence and location of the parking lot, and the availability of an open parking space within the parking lot.

In operation 610, ADV 101 parking planner 308 forms the parking problem of the ADV 101 parking in a selected parking space based upon constraints of the parking lot, constraints of the parking space, a current location and orientation of the ADV 101 within the parking lot, and kinematic constraints of the ADV 101. Kinematic constraints can include the length, width, and weight of the ADV, maximum steering angle forward driving direction and reverse driving direction of the ADV 101, maximum acceleration and speed capabilities of the ADV, braking distance capability of the ADV.

In operation 615, ADV 101 parking planner 308 can generate a plurality of parking paths from the current ADV location to the parking space, taking into account the constraints of the parking lot, parking space, and kinematics of the ADV 101, but not taking into account any obstacles that may be surrounding the ADV. Each of the parking paths can include one or more segments. Each segment of a parking path has as an associated cost. The cost of a parking path can be the sum of the cost of the segments in the parking path.

Cost factors for a segment of the parking path can include a length of the parking path, time and/or speed to traverse the segment, a steering angle needed to traverse the segment, and braking that may be needed based upon speed of traversal of the segment of the parking path.

In operation 620, ADV 101 parking planner 308 selects one or more candidate parking paths having the least cost of the plurality of parking paths.

In operation 625, ADV 101 parking planner 308 can now consider one or more obstacles surrounding the ADV 101. Each obstacle has a set of constraints that indicate the size and location of the obstacle. The prediction module can predict a direction and speed of each obstacle. In an embodiment, for each candidate parking path, the constraints for the parking lot, parking space, and obstacles can be passed to a quadratic optimization module to determine whether the candidate parking path should remain a candidate or be eliminated. In operation 625, ADV 101 parking planner 308 can eliminate one or more of the candidate parking paths, based upon quadratic optimization analysis, and/or determining that the current, or predicted, location of an obstacle conflicts with a segment of a candidate parking path.

In operation 630, ADV 101 parking planner 308 can determine whether a suitable parking path can be selected from the remaining candidate parking paths. If so, then method 600 continues at operation 635, otherwise method 600 continues at operation 640.

In operation 635, the ADV selects a best parking path from the remaining candidate parking paths. The ADV 101 perception and planning modules can generate a reference line for the ADV 101 to navigate from the current location of the ADV 101 to the selected parking space. The ADV 101 then navigates the reference line from the current location of the ADV 101 to the selected parking space, and method 600 ends.

In operation 640, ADV 101 parking planner 308 can automatically relax one or more of the constraints used to solve the parking problem for the ADV 101. Constraints can include parking lot constraints, parking space constraints, kinematic constraints of the ADV, including a determined distance between the ADV 101 and obstacles, or constraints of the obstacles. Method 600 then resumes at operation 615, wherein the ADV 101 parking planner 308 forms the constraints for the parking problem and generates a plurality of parking paths that take into account the constraints, except constraints of the obstacles which are not considered in the parking problem in operation 615.

Figure 7:
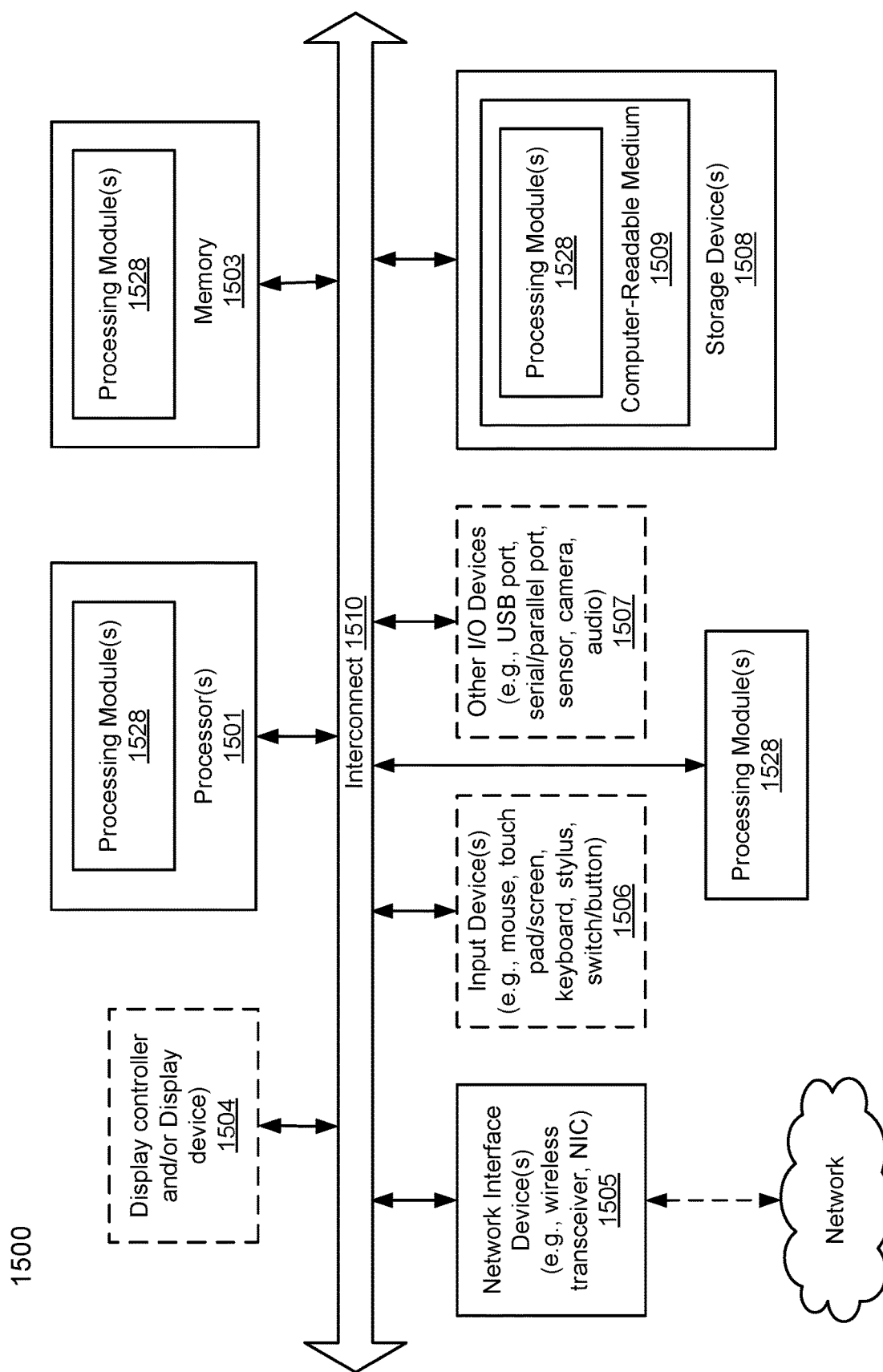
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft, Mac OS S from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or parking planning module 308, and perception/planning inverter 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/ logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of parking an autonomous driving vehicle (ADV), the method comprising:
    scanning a parking lot using map information and a sensor system that generates sensor information of the ADV to determine and select an available parking space within the parking lot;
    determining a plurality of parking lot constraints and a plurality of parking space constraints of the selected parking space using the map information and sensor system of the ADV;
    determining a set of kinematic constraints on the ADV;
    determining a plurality of parking paths from a current location of the ADV to the selected parking space based at least in part on the plurality of parking lot constraints, a plurality of parking space constraints of the selected parking space, the kinematic constraints upon the ADV, without considering any obstacles that may be surrounding the ADV;
    determining a cost for each parking path in the plurality of parking paths;
    selecting a plurality of candidate parking paths from the plurality of parking paths having a least cost among the plurality of parking paths;
    detecting a plurality of obstacles surrounding the ADV, using the map information and sensor information of the ADV, wherein at least one of the plurality of obstacles includes a projected speed and a projected direction;
    prior to navigating the ADV to the selected parking space, for each candidate parking path in the plurality of candidate parking paths:
        in response to determining that any static obstacle in the plurality of obstacles will conflict with the candidate parking path, eliminating the candidate parking path,
        in response to determining that any obstacle in the plurality of obstacles having a projected speed and a projected direction, and having a predicted location that will conflict with the candidate parking path, eliminating the candidate parking path;
    selecting a parking path from the remaining candidate parking paths having the least cost;
    generating a reference line to navigate the ADV based on the selected parking path; and
    navigating the ADV from the current ADV location to the parking space using the reference line.

2. The method of claim 1, wherein determining the cost of a parking path is based at least in part on whether a portion of the parking path is driven in reverse, and whether the parking path requires the ADV to change a direction of the ADV from forward to reverse or reverse to forward, and logic of the ADV monitors and updates a location of each of the plurality of obstacles, including the predicted location of at least one obstacle having the predicted speed and predicted direction, during both forward and reverse driving direction of the ADV.

3. The method of claim 1, further comprising:
    determining a plurality of kinematic constraints of the ADV, wherein determining the plurality of parking paths is further based at least in part on the plurality of kinematic constraints of the ADV, and wherein a number of the selected plurality of candidate parking paths is a fixed number of the plurality of parking paths or a fixed percentage of the plurality of parking paths.

4. The method of claim 3, wherein the plurality of kinematic constraints comprise: a length of the ADV, a width of the ADV, a maximum steering angle of the ADV, a maximum acceleration or deceleration of the ADV, a maximum or minimum speed of the ADV, and whether the ADV is driving in a forward mode or reverse mode.

5. The method of claim 1, wherein the plurality of parking lot constraints, the plurality of parking space constraints, the kinematic constraints, and a plurality of obstacle constraints for each obstacle in the plurality of obstacles are expressed as a set of affines.

6. The method of claim 5, wherein determining the plurality of parking paths further comprises performing a quadratic optimization on the parking lot constraints, parking space constraints, and kinematic constraints of the ADV.

7. The method of claim 1, further comprising:
    prior to navigating the ADV to the selected parking space, in response to determining that, after eliminating at least one of the plurality of candidate paths, there is no remaining candidate path:
        automatically relaxing at least one constraint of at least one obstacle;
        determining a new plurality of parking paths without considering any obstacles surrounding the ADV;
        determining a cost for each parking path in the new plurality of parking paths;
        selecting a new plurality of candidate parking paths from the new plurality of parking paths having a least cost among the new plurality of parking paths;
        for each candidate parking path in the new plurality of candidate parking paths:

in response to determining that any static obstacle in the plurality of obstacles will conflict with the candidate parking path, eliminating the candidate parking path; and in response to any obstacle in the plurality of obstacles having a projected speed and a projected direction, and having a predicted location conflicting with the candidate parking path, eliminating the candidate parking path;

selecting a new parking path from the remaining new candidate parking paths;

generating a new reference line to navigate the ADV based on the selected new parking path; and navigating the ADV from the current ADV location to the parking space using the new reference line.

8. A non-transitory computer-readable medium programmed with executable instructions that, when executed by a processing system, perform operations for parking an autonomous driving vehicle (ADV), the operations comprising:

scanning a parking lot using map information and a sensor system that generates sensor information of the ADV to determine and select an available parking space within the parking lot;

determining a plurality of parking lot constraints and a plurality of parking space constraints of a selected parking space using the map information and sensor system of the ADV;

determining a set of kinematic constraints on the ADV;

determining a plurality of parking paths from a current location of the ADV to the selected parking space based at least in part on the plurality of parking lot constraints, a plurality of parking space constraints of the selected parking space, the kinematic constraints upon the ADV, and without considering any obstacles surrounding the ADV;

determining a cost for each parking path in the plurality of parking paths;

selecting a plurality of candidate parking paths from the plurality of parking paths having a least cost among the plurality of parking paths;

detecting a plurality of obstacles surrounding the ADV using the map information and sensor information of the ADV, wherein at least one of the plurality of obstacles includes a projected speed and a projected direction;

prior to navigating the ADV to the selected parking space, for each candidate parking path in the plurality of candidate parking paths:

in response to determining that any static obstacle in the plurality of obstacles will conflict with the candidate parking path, eliminating the candidate parking path, in response to determining that any obstacle in the plurality of obstacles having a projected speed and a projected direction, and a predicted location that will conflict with the candidate parking path, eliminating the candidate parking path;

selecting a parking path from the remaining candidate parking paths;

generating a reference line to navigate the ADV based on the selected parking path; and navigating the ADV from the current ADV location to the parking space using the reference line.

9. The medium of claim 8, wherein determining the cost of a parking path is based at least in part on whether a portion of the parking path is driven in reverse, and whether the parking path requires the ADV to change a direction of the ADV from forward to reverse or reverse to forward driving direction, and logic of the ADV monitors and updates a location of each of the plurality of obstacles, and the predicted location of at least one obstacle having the predicted speed and predicted direction, during both forward and reverse driving directions of the ADV.

10. The medium of claim 8, the operations further comprising:

determining a plurality of kinematic constraints of the ADV, wherein determining the plurality of parking paths is further based at least in part on the plurality of kinematic constraints of the ADV, and wherein a number of the selected plurality of candidate parking paths is a fixed number of the plurality of candidate parking paths or a fixed percentage of the plurality of parking paths.

11. The medium of claim 10, wherein the plurality of kinematic constraints comprise: a length of the ADV, a width of the ADV, a maximum steering angle of the ADV, a maximum acceleration or deceleration of the ADV, a maximum or minimum speed of the ADV, and whether the ADV is driving in a forward mode or reverse mode.

12. The medium of claim 8, wherein the plurality of parking space constraints and a plurality of obstacle constraints are expressed as a set of affines.

13. The medium of claim 12, wherein determining the plurality of parking paths further comprises performing a quadratic optimization on the parking lot constraints, parking space constraints, kinematic constraints, and plurality of obstacle constraints for each of the plurality of obstacles.

14. The medium of claim 8, further comprising:

prior to navigating the ADV to the selected parking space, in response to determining that, after eliminating at least one of the plurality of candidate paths, there is no remaining candidate path:

automatically relaxing at least one constraint of at least one obstacle;

determining a new plurality of parking paths without considering any obstacles surrounding the ADV;

determining a cost for each parking path in the new plurality of parking paths;

selecting a new plurality of candidate parking paths from the new plurality of parking paths having a least cost among the new plurality of parking paths; and for each candidate parking path in the new plurality of candidate parking paths:

in response to determining that any static obstacle in the plurality of obstacles will conflict with conflict with any segment of the candidate parking path, eliminating the candidate parking path; and in response to any obstacle in the plurality of obstacles has a projected speed and a projected direction, and having a predicted location that will conflict with any segment of the candidate parking path, eliminating the candidate parking path;

selecting a new parking path from the remaining new candidate parking paths;

generating a reference line to navigate the ADV based on the selected new parking path; and navigating the ADV from the current ADV location to the parking space using the reference line.

15. A system comprising a processing system having at least one hardware processor, the processing system coupled to a memory programmed with executable instructions that, when executed by the processing system perform operations for parking an autonomous driving vehicle (ADV), the operations comprising:

scanning a parking lot using map information and a sensor system that generates sensor information of the ADV to determine and select an available parking space within the parking lot;

determining a plurality of parking lot constraints and a plurality of parking space constraints of a selected parking space using the map information and sensor system of the ADV;

determining a set of kinematic constraints on the ADV;

determining a plurality of parking paths from a current location of the ADV to the selected parking space based at least in part on the plurality of parking lot constraints, a plurality of parking space constraints of the selected parking space, the kinematic constraints upon the ADV, and without considering any obstacles that may be surrounding the ADV;

determining a cost for each parking path in the plurality of parking paths;

selecting a plurality of candidate parking paths from the plurality of parking paths having a least cost among the plurality of parking paths;

detecting a plurality of obstacles surrounding the ADV using the map information and sensor information of the ADV, wherein at least one of the plurality of obstacles includes a projected speed and a projected direction;

prior to navigating the ADV to the selected parking space, for each candidate parking path in the plurality of candidate parking paths:
in response to determining that any static obstacle in the plurality of obstacles will conflict with the candidate parking path, eliminating the candidate parking path,
in response to determining that any obstacle in the plurality of obstacles having a projected speed and a projected direction, and a predicted location that will conflict with the candidate parking path, eliminating the candidate parking path;

selecting a parking path from the remaining candidate parking paths;

generating a reference line to navigate the ADV based on the selected parking path; and navigating the ADV from the current ADV location to the parking space using the reference line.

16. The system of claim 15, wherein determining the cost of a parking path is based at least in part on whether a portion of the parking path is driven in reverse, and whether the parking path requires the ADV to change a direction of the ADV from forward to reverse or reverse to forward driving direction, and logic of the ADV monitors and updates a location of each of the plurality of obstacles, and the predicted location of at least one obstacle having the predicted speed and predicted direction, during both forward and reverse driving direction of the ADV.

17. The system of claim 15, the operations further comprising:
determining a plurality of kinematic constraints of the ADV, wherein determining the plurality of parking paths is further based at least in part on the plurality of kinematic constraints of the ADV, and wherein a number of the selected plurality of candidate parking paths is a fixed number of the plurality of parking paths or a fixed percentage of the plurality of parking paths.

18. The system of claim 17, wherein the plurality of kinematic constraints comprise: a length of the ADV, a width of the ADV, a maximum steering angle of the ADV, a maximum acceleration or deceleration of the ADV, a maximum or minimum speed of the ADV, and whether the ADV is driving in a forward mode or reverse mode.

19. The system of claim 15, wherein the plurality of parking lot constraints, the plurality of parking space constraints, the kinematic constraints, and a plurality of obstacle constraints for each obstacle in the plurality of obstacles are expressed as a set of affines.

20. The system of claim 19, wherein determining the plurality of parking paths further comprises performing a quadratic optimization on the parking lot constraints, parking space constraints, and the kinematic constraints.

21. The system of claim 15, the operations further comprising:
prior to navigating the ADV to the selected parking space, in response to determining that, after eliminating at least one of the plurality of candidate paths, there is no remaining candidate path:
automatically relaxing at least one constraint of at least one obstacle;
determining a new plurality of parking paths without considering any obstacles surrounding the ADV;
determining a cost for each parking path in the new plurality of parking paths;
selecting a new plurality of candidate parking paths from the new plurality of parking paths having a least cost among the new plurality of parking paths;
for each candidate parking path in the new plurality of candidate parking paths:
in response to determining that any static obstacle in the plurality of obstacles will conflict with conflict with the candidate parking path, eliminating the candidate parking path; and
in response to any obstacle in the plurality of obstacles having a projected speed and a projected direction, and having a predicted location that will conflict with the candidate parking path, eliminating the candidate parking path;
selecting a new parking path from the remaining new candidate parking paths;
generating a new reference line to navigate the ADV based on the selected new parking path; and
navigating the ADV from the current ADV location to the parking space using the new reference line.

* * * * *